United States Patent
Wang et al.

(10) Patent No.: US 7,529,554 B2
(45) Date of Patent: *May 5, 2009

(54) SUBTRACTIVE MULTIPATH DELAY DETECTION

(75) Inventors: Xiaohui Wang, Lund (SE); Anders Ericsson, Södra Sandby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 301 days.

This patent is subject to a terminal disclaimer.

(21) Appl. No.: 11/532,311

(22) Filed: Sep. 15, 2006

(65) Prior Publication Data

US 2007/0110138 A1    May 17, 2007

Related U.S. Application Data

(63) Continuation of application No. 10/437,285, filed on May 14, 2003, now Pat. No. 7,116,998.

(51) Int. Cl.
*H04B 7/01* (2006.01)

(52) U.S. Cl. .................... 455/506; 455/67.16; 455/504; 370/342

(58) Field of Classification Search ............... 455/506, 455/67.11, 67.16, 65, 63.1, 323, 334, 522; 370/342; 375/147, 148, 347, 150
See application file for complete search history.

(56) References Cited

U.S. PATENT DOCUMENTS

| | | | |
|---|---|---|---|
| 7,116,998 B2* | 10/2006 | Wang et al. | 455/506 |
| 7,194,018 B2* | 3/2007 | Han et al. | 375/147 |
| 2003/0103555 A1* | 6/2003 | Han et al. | 375/147 |
| 2004/0223540 A1* | 11/2004 | Shan | 375/150 |
| 2006/0274819 A1* | 12/2006 | Bengtsson | 375/147 |

* cited by examiner

*Primary Examiner*—Tan Trinh
(74) *Attorney, Agent, or Firm*—Potomac Patent Group PLLC (57) ABSTRACT

In a RAKE receiver delays associated with multipath signals are determined by subtracting power values associated with sidelobes of a peak value for each of the multipath signals. The determination can be performed in two stages, in the first stage the determination of the delays is made without accounting for a phase difference between adjacent multipath signals, while in the second stage the determinations are made accounting for the phase difference.

26 Claims, 10 Drawing Sheets

SUBTRACTIVE MULTIPATH DELAY DETECTION

This application is a continuation of U.S. patent application Ser. No. 10/437,285 filed on May 14, 2003 now U.S. Pat. No. 7,116,998, and claims the benefit of the filing date of and incorporates here by reference that application.

BACKGROUND

Due to the limited radio spectrum allocated by governmental bodies, various techniques have been employed to allow multiple users to access the allocated radio spectrum. One type of multiple access technique is known as Code Division Multiple Access (CDMA). In systems which operate using CDMA techniques, an information data stream to be transmitted is modulated by a data sequence with a much higher data rate, referred to as a "signature sequence." The signature sequence usually comprises N bits, wherein each of the N bits is denoted as a "chip."

A well-known source of degradation common to all known wireless multiple access systems, particularly in terrestrial environments, is known as "multipath fading." In a multipath environment, the transmitted signal follows several propagation paths from a transmitter to a receiver, typically as a result of the signal reflecting off one or more objects before arriving at the receiver. Since the various propagation paths of the transmitted signal are of unequal lengths, several copies of the transmitted signal, referred to as "rays," will arrive at the receiver with varying time delays. In a multipath fading channel, phase interference between different rays may cause severe fading and result in signal dropout or cancellation.

A mobile station in a CDMA system is typically equipped with a RAKE receiver for demodulating active channels (i.e., channels carrying control and/or user data) and for compensating for multipath delays. The RAKE receiver comprises a number of RAKE fingers and a combiner for combining the output of each of the RAKE fingers. When demodulating a multipath fading channel, each finger of the RAKE receiver must be synchronized with one of the diverse propagation paths of the channel. A RAKE receiver with L fingers is able to detect, at most, L copies of the transmitted signal, which are individually despread by the RAKE fingers according to the individual delays and are added coherently in the combiner. At the addition performed by the combiner, each despread output from a RAKE finger is multiplied with a complex weight. Typically, these weights can be set as the complex conjugate of the corresponding coefficient of the channel impulse response at the appropriate delays. For this, the channel impulse response must be estimated at the delays, a process which, for example, can be made by a separate algorithm in the digital signal processor. The resulting signal will thus comprise a collection of all the time delayed copies of the transmitted signal.

The relative time delays of the received rays must be determined in order to synchronize the various rays with the corresponding fingers of the RAKE receiver. Unfortunately, the number and magnitude of the time delays may change, e.g., due to the movement of the mobile station, i.e., variable distance and velocity relative to the transmitting base station and reflecting objects for users in motion. Also, movement of the mobile station may cause new channel paths to appear and old channel paths to disappear. Hence, the mobile station must continuously monitor the signals received along all propagation paths of an active channel in order to search for new, stronger channel paths. To perform this monitoring efficiently, the multipath time delays must be measured or estimated repeatedly in a fast and accurate manner. Typically, this is performed by a delay estimator.

The simplest approach to delay estimation (DE) is evaluating the impulse response of the channel over the whole range of the possible delays, or the delay spread, of the channel. The resulting complex delay profile (CDP) or power delay profile (PDP) may then be subjected to peak detection, and the peak locations are reported to the RAKE as the delay estimates. However, the processing and power consumption expense of frequently executing this path searching routine is usually prohibitive. Therefore, typical implementations use shortened search windows, reduced searcher resolution, and additional short sub-searchers to produce higher-resolution estimates of certain areas of the power delay profile.

A typical approach, in the case where several distinct multipath channels with different path structure need to be characterized, includes applying a delay estimation and subsequent channel estimation algorithm to each of these channels.

Figure 1:
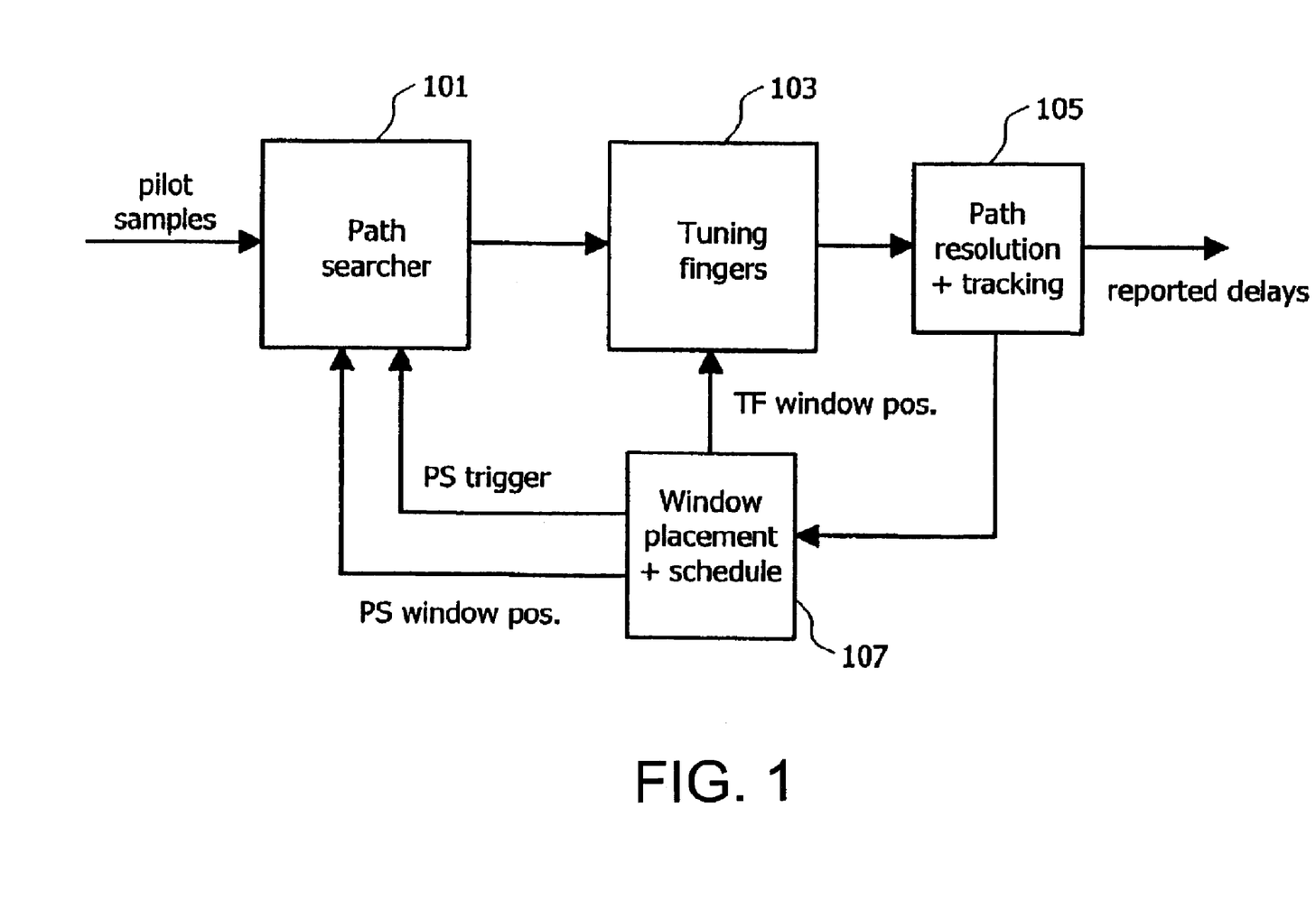
FIG. 1 illustrates components employed in a conventional delay estimator.

FIG. 1 illustrates one conventional approach to delay estimation. Pilot samples received over the air interface are provided to path searcher 101. Path searcher 101 computes instantaneous impulse estimates (complex or power) over a range of delays that constitute a significant fraction of the maximal delay spread allowed by the system. The complex value or power value for a given delay value is estimated, e.g., by correlating the received data for pilot symbols with an appropriately delayed copy of the spreading sequence. The path searcher is employed mainly for detecting the existence of paths and its output resolution may be lower than that required by the RAKE.

The tuning fingers 103 receive the coarse power delay profile information provided by the path searcher 101 and produce a high-resolution instantaneous complex delay profile or power delay profile over one or several narrow delay windows. Path resolution, tracking and reporting block 105 extracts physical path location information from the path searcher 101 and the tuning fingers 103, and presents delay estimates consistently to subsequent RAKE receiver stages. Unchanging assignment of paths to RAKE fingers is necessary to support filtering of power and interference estimation for each finger. The degree of complexity of the block 105 can vary significantly depending on system parameters, ranging from simple peak detection to sophisticated deconvolution and filtering.

Scheduling and window placement block 107 determines the timing of activation of the path searcher 101 and the tuning fingers 103, and their window positions for each cycle. The timing may be fixed (periodic) or depends on signals derived from the environment, while the positioning usually depends on the location of previously detected paths.

To increase robustness of the delay estimation under various difficult channel conditions (low signal-to-interference ratio (SIR), wide delay spread, closely-spaced paths, etc.), averaging of memory can be added to the algorithms so that the delay estimation process operates across many channel fading cycles and is not significantly affected by the instantaneous fading realization.

Following delay estimation, channel estimation for the reported delays is performed by tuning despreaders to these delays and using the despread pilot symbols to deduce the complex path coefficient for a given delay. A variety of filtering or smoothing methods may be applied to these instantaneous estimates, in order to improve the quality of the channel estimates. These methods are well known in the art.

Regardless of the specific implementation, the complexity of the delay estimation process is significantly higher than that of the channel estimation operation. Similarly, the sensitivity of the delay estimation to low SIR conditions is significantly higher, causing rapid deterioration below a certain threshold, compared to the channel estimation process which degrades more gradually.

Figure 2:
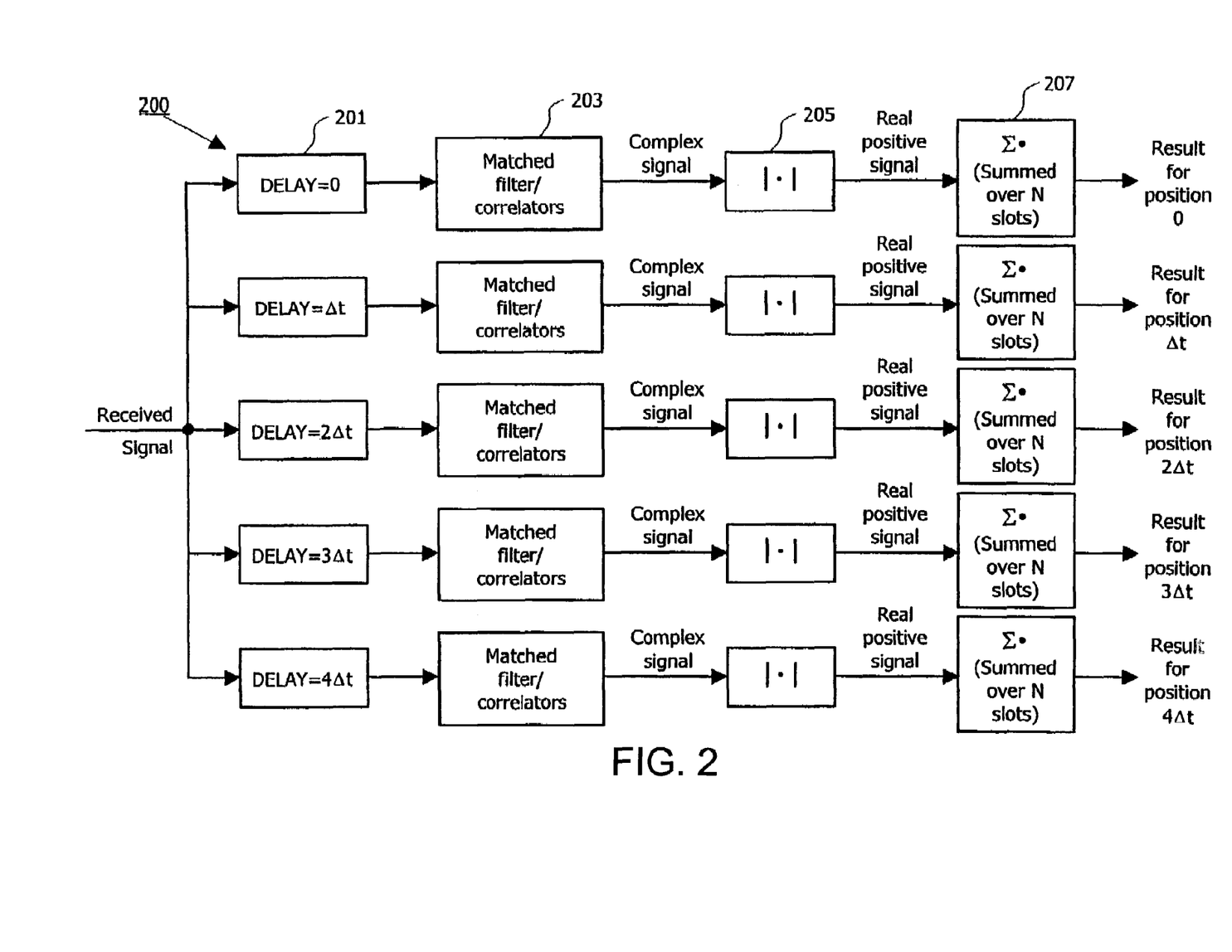
FIG. 2 illustrates a conventional delay estimator.

It can be appreciated that the quality of performance of a RAKE receiver is related to how well the channel delay estimator performs. The more accurate the estimates of signal path delays, the better the RAKE receiver will perform. An exemplary channel delay estimator 200 is illustrated in FIG. 2. The channel delay estimator 200 tests different delay versions of the received signal for correlation with a given spreading sequence. For each hypothesized delay, the degree of correlation determines whether the hypothesized delay represents an actual delay experienced by the received signal. To carry out this process, the exemplary channel delay estimator 200 has five "probing fingers", each associated with one of the hypothesized delays: $t_0, t_1, t_2, t_3, t_4$. These could, for example, be equally spaced with respect to one another, such as at $0, \Delta t, 2\Delta t, 3\Delta t, 4\Delta t$, as illustrated in FIG. 2. As can be appreciated, there will always be some minimal amount of delay, so having $t_0=0$ absolutely may not be physically possible. However, the delay associated with $t_0$ may be used as a base offset, with each of the hypothesized delays reduced by the base offset amount, making it possible for $t_0=0$ relative to the base offset. By making $\Delta t$ small, it is possible to fine tune a delay estimate and track changes in the delay. The choice of five probing fingers in this example is merely for illustration: The number of probing fingers in any particular embodiment is a design choice that can be less than, equal to, or greater than five.

The received signal is supplied to a delay unit 201 that aligns the signal to be processed in accordance with the hypothesized delay. The (delayed) received signal is then passed through a matched filter or correlator 203. The matched filter 203 generates an estimate of the impulse response of the channel. This estimate is generally a complex-valued signal.

If the channel parameters are subject to fast changes, the estimates, made for each of the number N of time slots, may be summed non-coherently. This means that the absolute value of the complex signal is determined (block 205), and then summed with the values obtained for the signal during other time slots (summing block 207). Alternatively, if the channel parameters are subject to slow changes, then the channel estimates may be summed coherently, so that the absolute value block 205 would not be present. In other alternative embodiments, a combination of coherent and non-coherent averaging is also possible.

In either case, the result of summing blocks 207 for each position ($0, \Delta t, 2\Delta t, 3\Delta t, 4\Delta t$) are compared and the position having the highest summed value is selected, as illustrated in FIG. 2. The real-valued summed results for each signal position of the channel delay estimator are fed into a selector. The selector determines the position having the highest summed value. The parameters associated with this position, such as the estimated delay or impulse response, may be used by the RAKE receiver. For example, the position parameters may be used by a searcher to synchronize the RAKE receiver to different paths.

The fact that the channel is fading will prevent every time slot from contributing to the estimate of the delays. However, the variations of the channel in general are such that the fading process is much faster than the changes of the delays. Thus, if we assume merely for the sake of example that, on average, there are two equally strong paths with gain $h_1$ and $h_2$, two peaks will be built up over time in the cumulated sum over different time slots, so long as the delays are sufficiently well separated in time.

Conventional techniques for addressing multipath propagation may not correctly identify the delay of particular paths when the mutual difference in delay between multiple paths is small. These inaccurate delay estimations can cause serious degradation in the performance of the RAKE receiver.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with exemplary embodiments of the present invention a method and apparatus are provided for determining delays of multipath signals. A power delay profile comprising at least a first and second multipath signal is received. A first peak power value in the power delay profile is detected. Power values associated with the first detected peak power value are subtracted from the power delay profile to generate a modified power delay profile. A second peak power value in the modified power delay profile is detected. Power values associated with the second detected peak power value are subtracted from the modified power delay profile to generate another modified power delay profile. The delays associated with the first and second multipath signals are determined by locating a peak power associated with the first and second multipath signals in the another modified power delay profile.

In accordance with another aspect of the present invention, a method and apparatus are provided for determining delays of multipath signals. A power delay profile comprising at least a first and second multipath signal are received. A first set of delays associated with the first and second multipath signals are determined, the first set of delays being determined without accounting for a phase difference between the first and second multipath signals. Channel estimation is performed using the determined first set of delays, the channel estimation producing a phase difference between the first and second multipath signals. A second set of delays associated with the first and second multipath signals are determined, the second set of delays being determined based on the phase difference produced by the channel estimation.

BRIEF DESCRIPTION OF THE DRAWING FIGURES

The objects and advantages of the invention will be understood by reading the following detailed description in conjunction with the drawings in which.

DETAILED DESCRIPTION

The various features of the invention will now be described with respect to the figures, in which like parts are identified with the same reference characters.

Figure 3A:
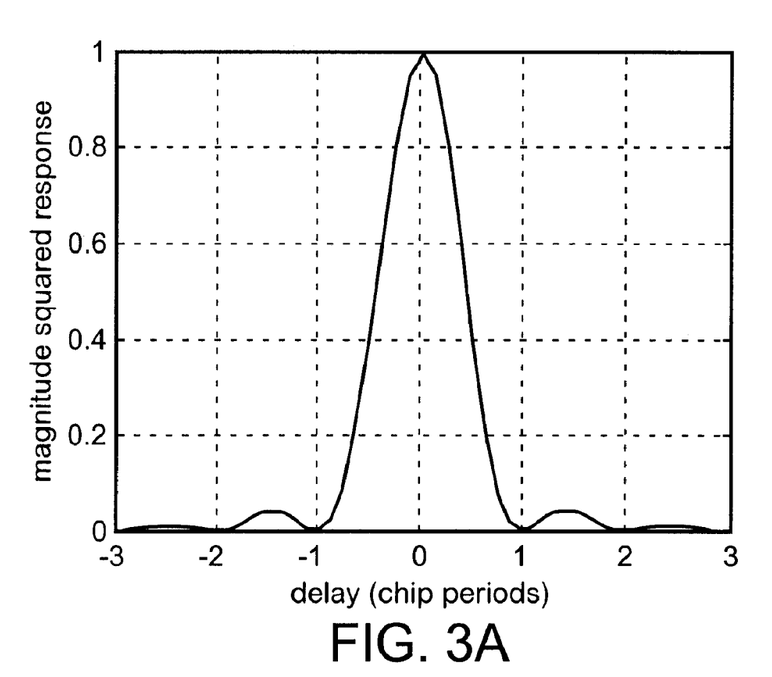
FIGS. 3A-3C illustrate two multipath signals and the combination of the signals as seen by a receiver.
Figure 3B:
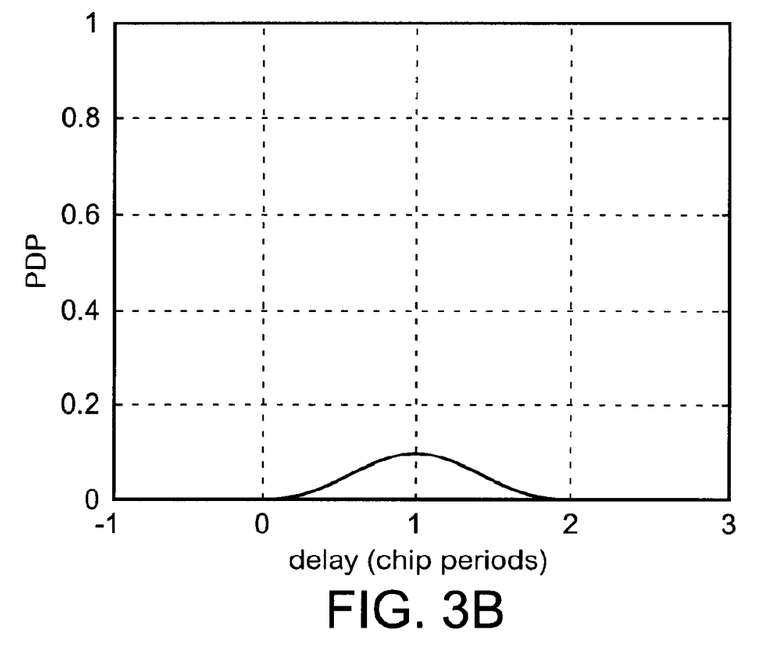
Figure 3C:
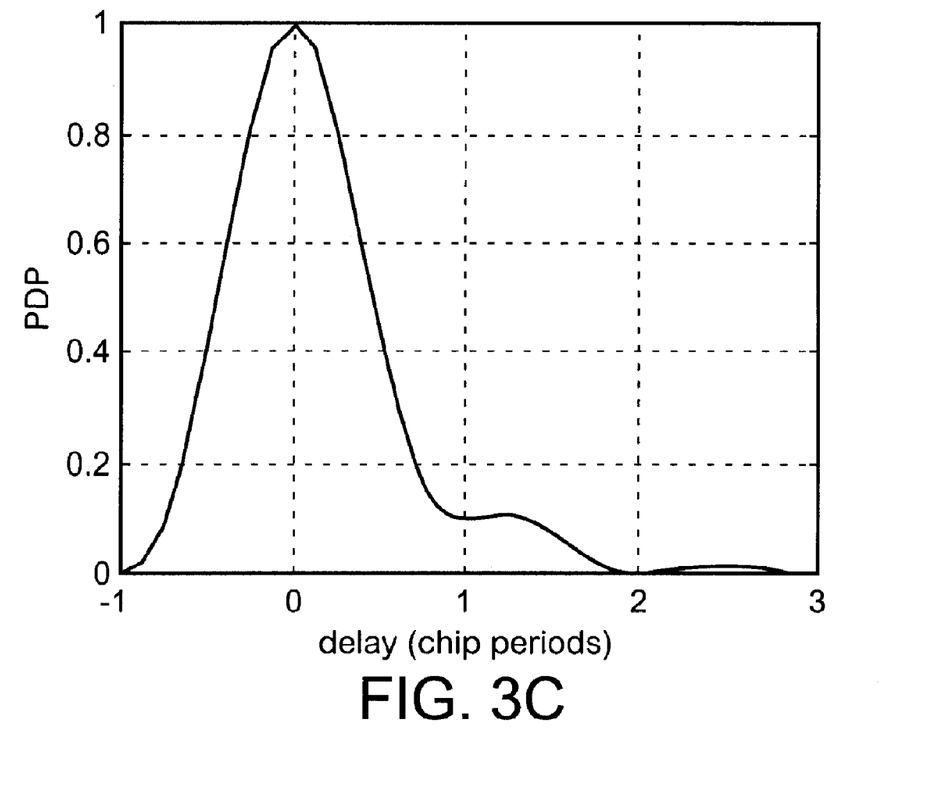

Problems encountered using conventional delay estimation techniques will be described in connection with FIGS. 3A-3C. FIGS. 3A and 3B illustrate two signals which can be received by a RAKE receiver. Assuming that the two signals illustrated in FIGS. 3A and 3B were received at the illustrated time delays, the RAKE receiver would see the signal illustrated in FIG. 3C. Conventional techniques for delay detections employ peak detection to estimate the various delay positions. Accordingly, conventional techniques would estimate that the first multipath signal has a delay of 0, while the second multipath signal has a delay of 1.25, i.e., the locations of the peak powers of the signal. However, referring to FIG. 3B it can be seen that the delay associated with the second multipath is 1 chip. The peak at 1.25 chips in the multipath signal of FIG. 3C is caused by the power of the sidelobe of the first multipath signal combining with the power of the peak of the second multipath signal. Accordingly, conventional peak detection techniques for delay estimation may produce inaccurate delay estimations when multipath signals are closely spaced.

Figure 4:
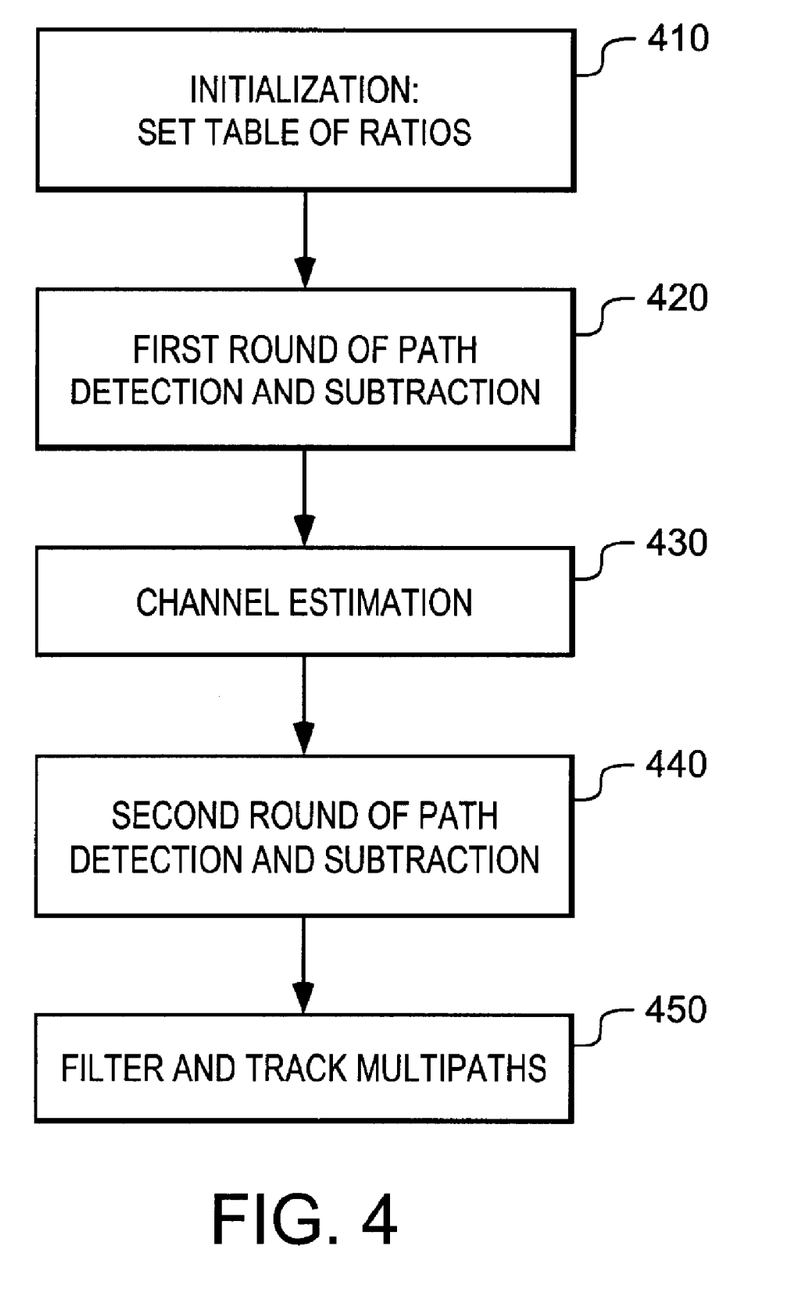
FIG. 4 illustrates an exemplary method for delay estimation in accordance with the present invention.

FIG. 4 illustrates an exemplary method for overcoming the above-identified and other deficiencies of conventional delay estimation techniques in accordance with the present invention. Generally, the delay detections are improved by minimizing the influences of other mainlobes and sidelobes. An initialization phase is performed to generate a table of the ratios of the power of the main peak and the powers of sample positions within several sidelobes (step 410). The table can be generated by calculating the power profiles of the despread signals of an isolated path for various noise and fading levels. Typically, the profiles fluctuate over time, mainly due to the dynamic behavior of the radio channels. The shapes of the profiles resemble the convolution of the pulse shaping filters employed in transmitters and receivers, with the difference being that there is a noise floor. On average the ratios of the power of the main peak and the powers of the sample positions within several sidelobes are rather stable. The determined ratios are stored in a table in the receiver. The generation of the table can be performed when the receiver is first powered up. Alternatively, the table can be generated and installed in the receiver during manufacture.

Figure 5A:
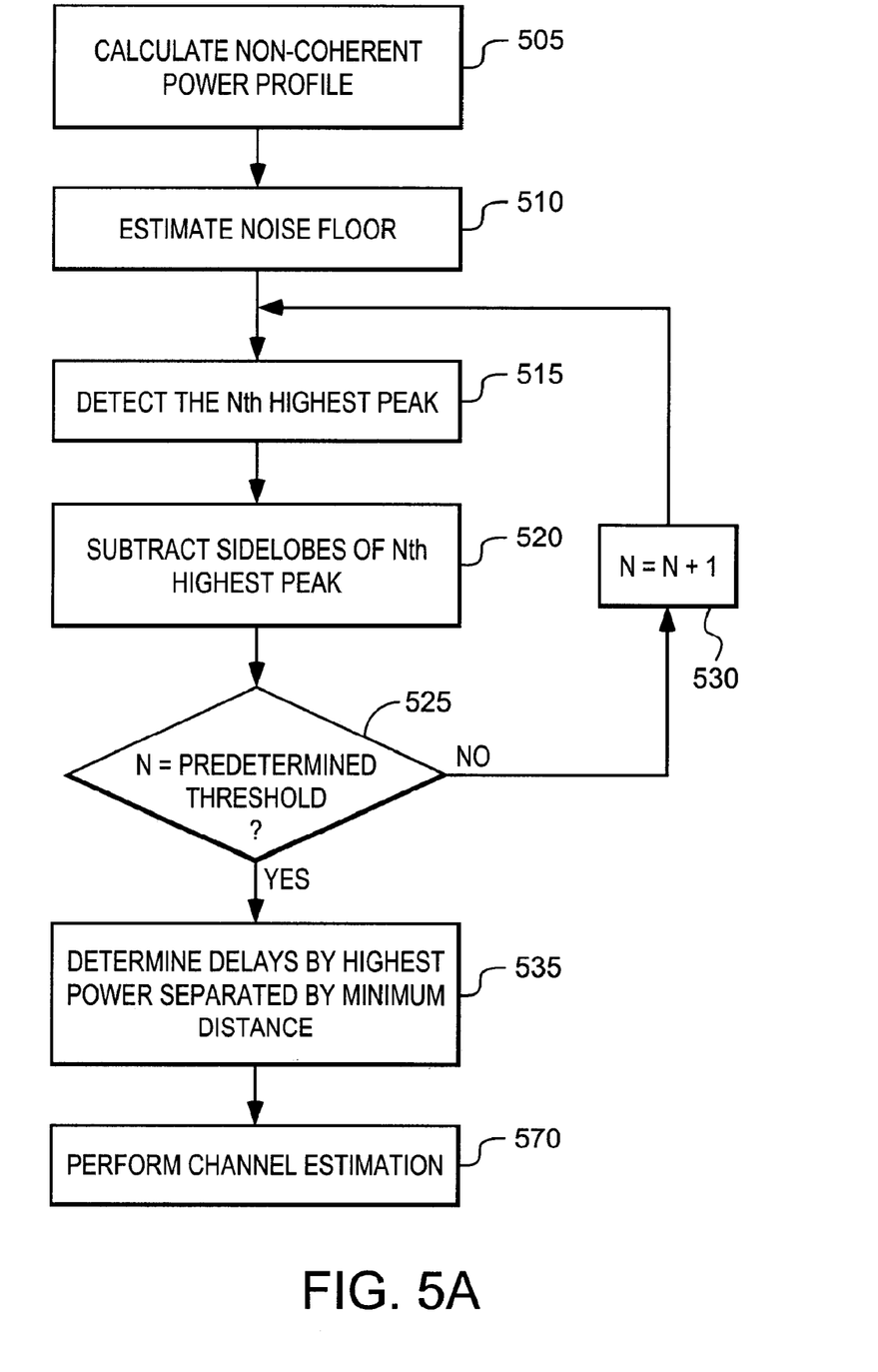
FIGS. 5A and 5B illustrate two exemplary methods for performing path detection and subtraction in accordance with the present invention.

After the table has been generated the receiver performs a first stage of path detection and subtraction (step 420). FIG. 5A illustrates an exemplary method for performing path detection and subtraction in accordance with the present invention. Initially, a long time non-coherently accumulated power delay profile is calculated (step 505), and the noise floor is estimated (step 510). The noise floor can be estimated by, for example, averaging the powers of a noise finger, or can be inferred from the shape of the main peak and the corresponding detected power values. Next, the Nth highest peak in the multipath signal is detected (step 515). Since this is the first iteration of the method, N=1, i.e., the highest peak is detected.

The powers of the sample positions within the predetermined number of sidelobes are subtracted from the power delay profile to generate a new power delay profile (step 520). This new power delay profile will not contain the power due to the sidelobes of the Nth highest detected peak. The subtraction is performed by multiplying the ratios listed in the table by the difference between the peak power and the noise floor to generate a product, and subtracting the product from the power delay profile. After the subtraction, it is determined whether N is equal to a predetermined threshold value (step 525). The predetermined threshold value can be based on the number of multipath delay detections desired. Accordingly, the predetermined threshold value can be set equal to the number of fingers employed in the tracking stage of the RAKE receiver. If N is not equal to the threshold ("No" path out of decision step 525), then N is incremented by one (step 530), and the next highest peak N will be detected. It will be recognized that the loop of steps 515-530 will continue to produce a power delay profile with less and less influence to the peak powers from sidelobes of other peak powers.

If N is equal to the predetermined threshold value ("Yes" path out of decision step 525), then the delays of the multipaths are determined as the positions corresponding to the highest powers separated by a minimal distance window. In order to properly detect the different multipath signals the ranges of subtractions should be carefully selected in accordance with the setting of the minimal distance windows. Since the main peak of the power delay profile has a width of approximately one chip, if the minimal distance window is set to a value greater than or equal to one chip, the subtraction of the sidelobes of the already found path will determine the peak position of the next path. If the minimal distance window is set to less than one chip, subtraction of parts of the mainlobe of the already found path becomes significant and should be included in the subtraction process.

Figure 6A:
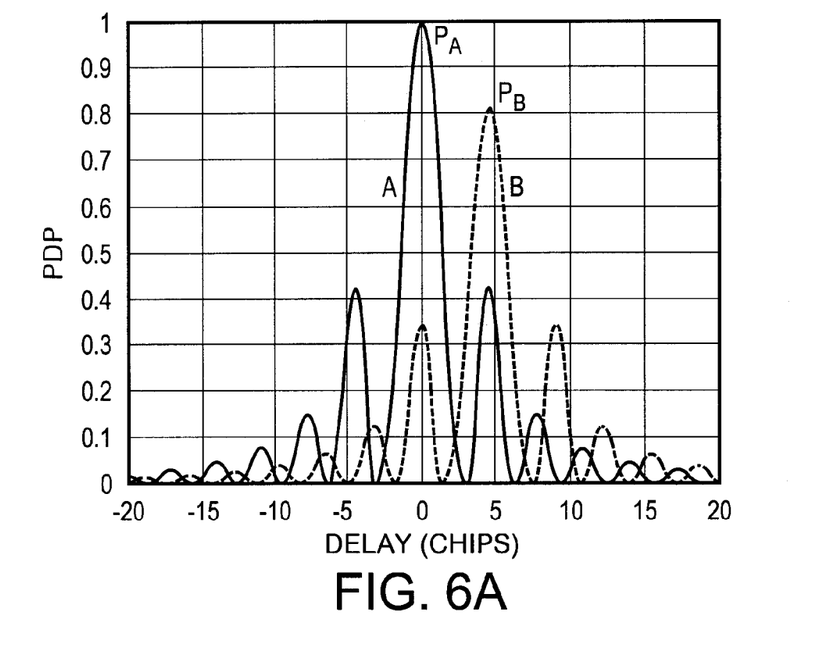
FIGS. 6A-6C illustrate the contribution from other multipath signals to a multipath signal.
Figure 6B:
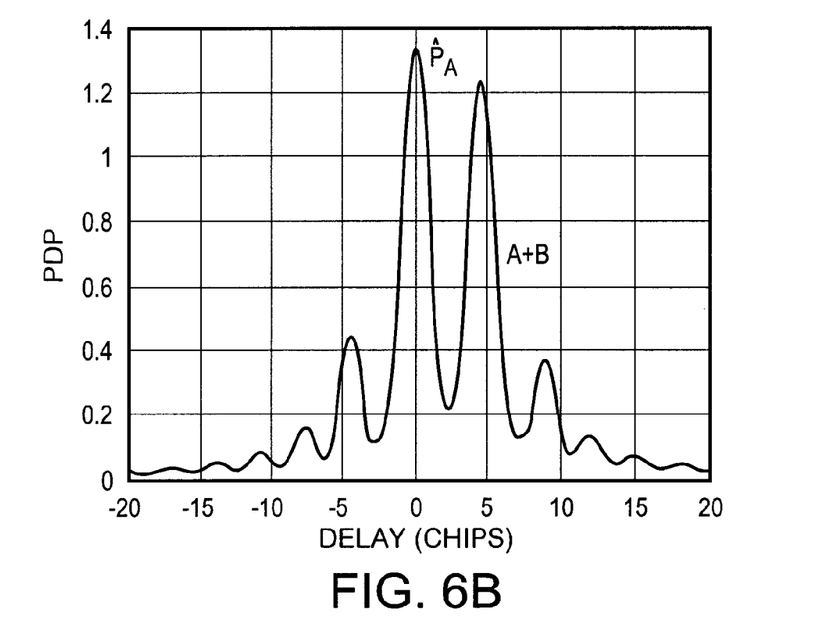
Figure 6C:
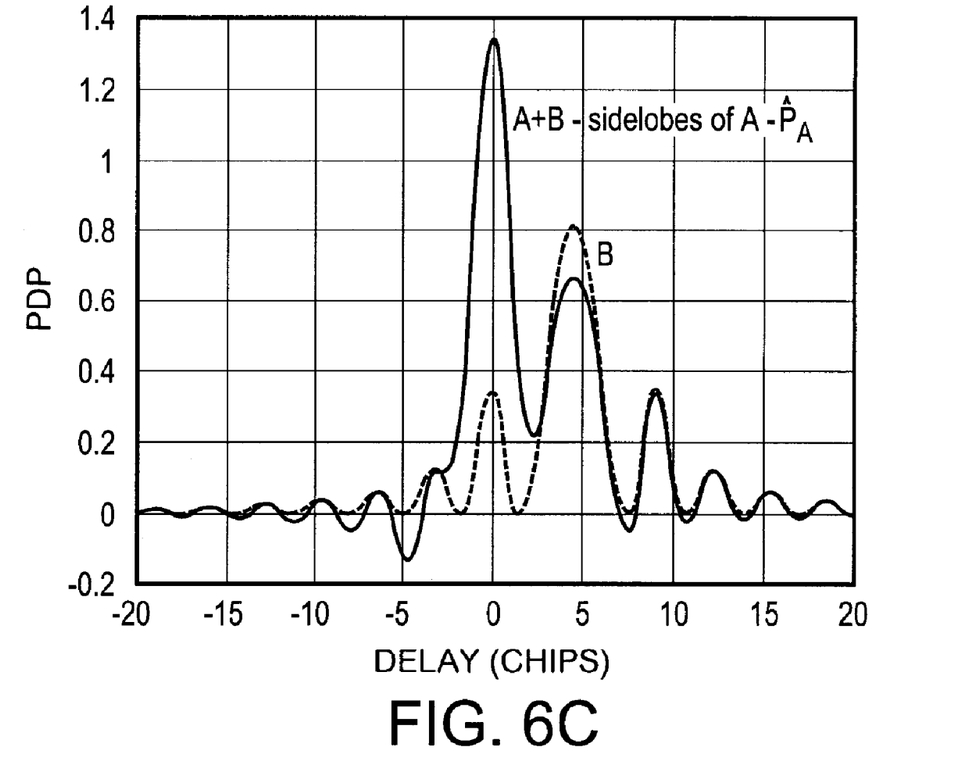

The approach mentioned above is good enough to detect peak positions in the cases with little interference between different multipaths. More advanced methods can be developed to deal with more complicated multipath profiles as will be demonstrated below. Since before the subtractions each large detected peak may contain contributions from other multipaths, the subtractions may be over-estimated. FIGS. 6A-6C illustrate this overestimation. Assume that the multipath signal illustrated in FIG. 6B is received, and that the signal contains two different paths, path A (with power $P_A$) and path B (with power $P_B$). See FIG. 6A. Since multipath and delay detection has not yet been performed, the signals will present a waveform at the receiver such as that illustrated in FIG. 6B. At each delay value, a received signal with two multipath components $\vec{S}_1$ and $\vec{S}_2$ can generally be expressed as:

$$\vec{S} = \vec{S}_1 + \vec{S}_2 = \vec{S}_1 \cdot (1 + \sqrt{P_2/P_1} * \exp(i\phi)) \quad (1)$$

where $S_k$ is the two-dimensional vector with the in-phase component $I_k$, quadrature component $Q_k$ and the power $P_k$, wherein k=1, 2. The quantity $\phi$ represents the phase difference between the two signals. From equation (1) the power of the total signal can be represented by:

$$P = P_1 * (1 + P_2/P_1 + 2 * \sqrt{P_1/P_2} * \cos(\phi)) \quad (2)$$

At this stage of the method a random phase approximation is applied to equation (2), which results in the total power being the direct summation of the powers of the two paths. Since, at this stage of the method, the power delay profile is accumulated non-coherently, the cosine term in equation (2) cancels.

Accordingly, the receiver will employ the power value ($P_A$ in FIG. 6B) for the largest peak for the subtraction, which comprises the sum of the power values of paths A and B. When the sidelobes of path A are subtracted the waveform illustrated in FIG. 6C results. Clearly, the subtracted peak power of path B is lower than the original peak power due to over-subtraction.

Figure 5B:
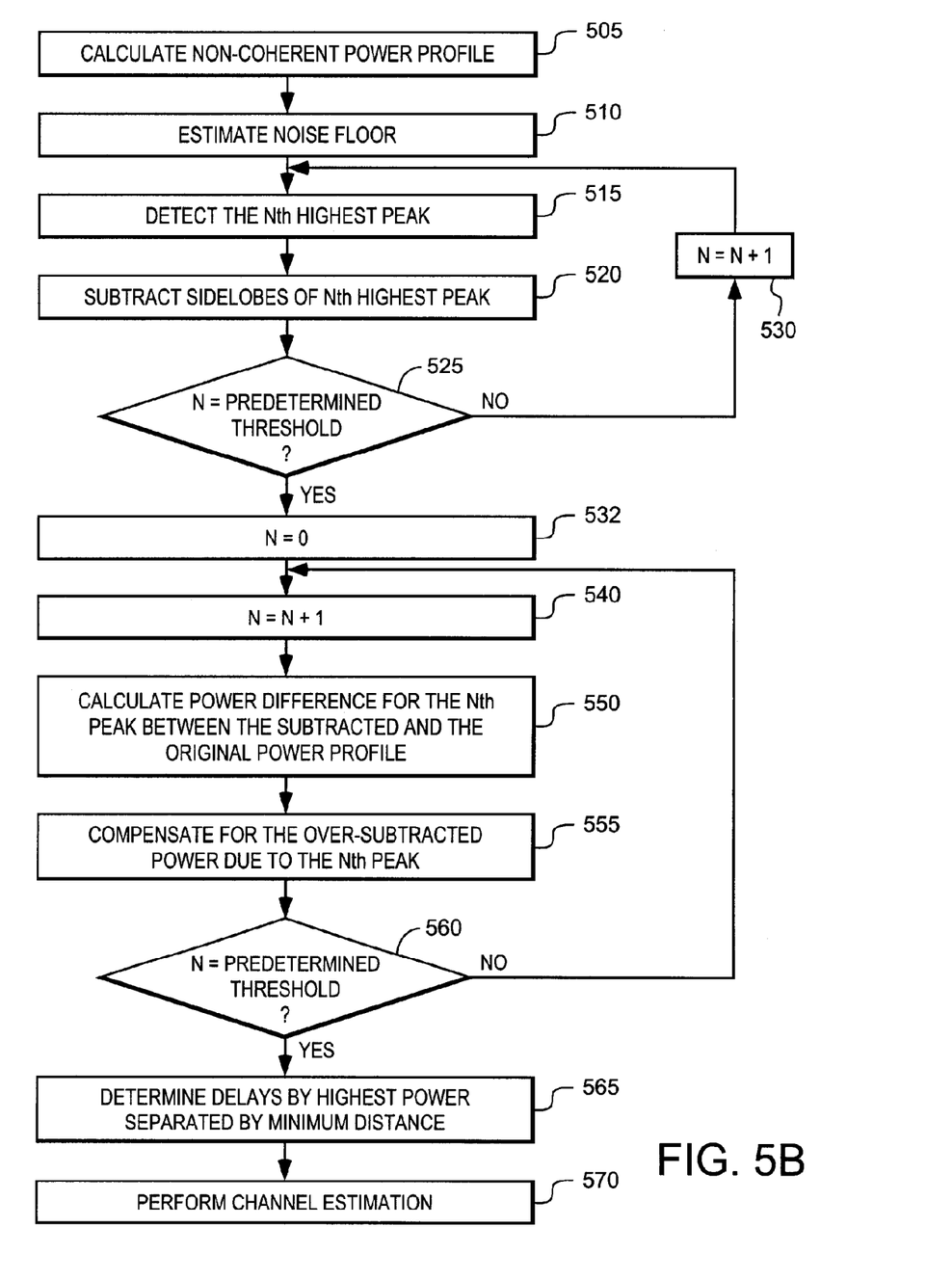

To address this over-subtraction problem, the method of FIG. 5A can be modified as illustrated in FIG. 5B. Specifically, in the method of FIG. 5B steps 532-560 are inserted between steps 525 and 565. When N is equal to the predefined threshold ("YES" path out of decision step 525), N is set equal to 0 (step 532). N is then incremented such that in this first instance the highest peak is employed, and in subsequent iterations the next highest peak is employed (step 540). The power difference for the Nth peak between the power delay profile after the sidelobes of the Nth peak is subtracted and the original power profile is calculated (step 550). The power difference is multiplied by a value from the table of power ratios to compensate for the over-subtracted powers due to the Nth peak (step 555). Next, it is determined whether N is equal to the predetermined threshold (step 560). If N is equal to the predetermined threshold ("Yes" path out of decision step 560), then the delays are determined by the highest power separated by minimum distance (step 565) and channel estimation is performed (step 570). If, however, N is not equal to the predetermined threshold ("No" path out of decision step 560), then steps 540-560 are repeated.

Although FIG. 5B illustrates only a single iteration of the loop of steps 532-560 for each of the N paths, multiple iterations of the loop for each of the N paths can be performed. In each of the subsequent iterations the estimate of the power values of the peaks will improve.

Returning now to FIG. 4, after the first stage of path detection is performed (step 420), channel estimation is performed (step 430). Depending upon how often the channel estimation is performed, the power delay profiles for the same period can be calculated and saved. Using the channel estimate, the phase difference $\phi$ in equation (2) can be determined in accordance with techniques well known in the art. The path detection is now performed using the method of FIG. 5A, except now the phase difference $\phi$ in equation (2) is employed in the delay determinations and subtractions (step 440). Specifically, the phase difference $\phi$ is employed in the subtraction of the Nth highest peak (step 520). By employing the phase difference $\phi$ in the subtractions a more accurate estimate can be obtained.

In the second stage of path detection the recursive subtraction scheme discussed in connection with FIG. 5B can be employed to achieve even more accurate estimations of the peak powers of the multipath signals. To perform the recursive subtractions discussed in connection with FIG. 5B additional memory space is required to store the power delay profiles during the time that the channel estimate is performed, and to store and process the recursive power subtraction. This may result in latency in the processing of the delay detections. However, since the sidelobes are much lower than the main peaks, a few iterations of steps 532-560 should provide an adequate estimate of the peak powers for the purposes of the RAKE receiver. Although there is a trade-off between the number of iterations of the recursive subtraction and the accuracy of the subtracted powers, to which the final detections of the multipaths are, in general, not very sensitive.

The results of the second stage of path detections and subtractions are employed in the filtering and tracking of the multipath signals (step 450). In general, filtering and tracking multipath signals is a conventional technique for RAKE receivers. Accordingly, filtering and tracking can be applied in numerous ways and on one or more sampling points for each path without interfering with the scope of the invention.

Figure 7:
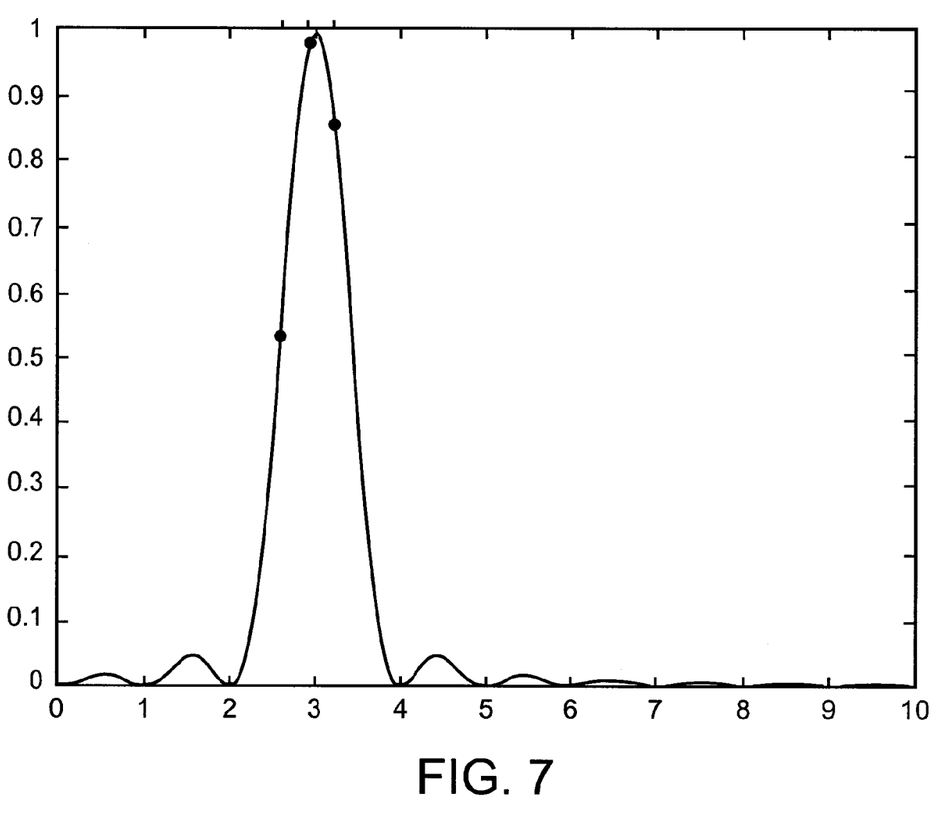
FIG. 7 illustrates an exemplary multipath signal for which multiple sample points are filtered and tracked in accordance with the present invention.

FIG. 7 illustrates three sampling points subject to filtering and tracking in accordance with exemplary embodiments of the present invention.

Although the exemplary embodiments have been described above in connection with CDMA, it will be recognized that the present invention is equally applicable to any type of multiple access technique which has to contend with multipath signals. Moreover, the present invention is applicable to any type of system in which multipath signals are present and distinguished by the system.

Thus, the preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for determining delays of multipath signals comprising:
   Receiving by a receiver a power delay profile comprising at least a first and second multipath signal;
   detecting a first peak power value in the power delay profile;
   subtracting power values associated with the first detected peak power value from the power delay profile to generate a modified power delay profile;
   detecting a second peak power value in the modified power delay profile;
   subtracting power values associated with the second detected peak power value from the modified power delay profile to generate at least a second modified power delay profile; and
   determining the delays associated with the first and second multipath signals by locating a peak power based on the first and second multipath signals in the second modified power delay profile.

2. The method of claim 1, further comprising:
   performing channel estimation using the determined delays, the channel estimation producing a phase difference between the first and second multipath signals;
   detecting a third peak power value in the power delay profile;
   subtracting power values associated with the third detected peak power value from the power delay profile to generate a third modified power delay profile, wherein the phase difference between the first and second multipath signals is employed in the subtraction;
   detecting a fourth peak power value in the third modified power delay profile;
   subtracting power values associated with the fourth detected peak power value from the third modified power delay profile to produce a fourth modified power delay profile, wherein the phase difference between the first and second multipath signals is employed in the subtraction; and
   determining the delays associated with the first and second multipath signals by locating a peak power based on the first and second multipath signals in the fourth modified power delay profile.

3. The method of claim 2, wherein the power values associated with the third and fourth detected peak power values are power values of sidelobes corresponding to the third and fourth detected peak power values.

4. The method of claim 2, wherein the power values associated with the third and fourth detected peak power values are power values of sidelobes and part of a mainlobe corresponding to the third and fourth detected peak power values.

5. The method of claim 2, wherein the first and third peak power values are peak power values of the first multipath signal, and the second and fourth peak power values are peak power values of the second multipath signal.

6. The method of claim 1, wherein the subtracting steps each comprise:
   determining a difference between the peak power value and a noise floor;
   multiplying the difference by a ratio to produce a product; and
   subtracting the product from the power delay profile at the delay values associated with the peak power value.

7. The method of claim 1, further comprising:
   calculating a difference between a power value at a location of the first detected peak power value in the power delay profile and a power value at the delay values associated with the first detected peak power value in the second modified power delay profile;
   multiplying the difference by a ratio to generate a product; and
   adding the product to the modified power delay profile at the location of the first detected peak power value.

8. The method of claim 1, further comprising:
   filtering and tracking peak power values associated with each determined delay.

9. The method of claim 8, wherein the filtering and tracking is performed for the peak power values and additional sample points associated with the peak power values.

10. The method of claim 1, wherein the power values associated with the first and second detected peak power values are power values of sidelobes corresponding to the first and second detected peak power values.

11. The method of claim 1, wherein the power values associated with the first and second detected peak power values are power values of sidelobes and part of a mainlobe corresponding to the first and second detected peak power values.

12. The method of claim 1, wherein the first and second detected peak power values are respectively the highest and second highest detected peak power values of the power delay profile.

13. A receiver that compensates for multipath delays, comprising:
   a path searcher which receives a power delay profile comprising at least a first and second multipath signal, detects a first peak power value in the power delay profile, subtracts power values associated with the first detected peak power value from the power delay profile to generate a modified power delay profile, detects a second peak power value in the modified power delay profile, subtracts power values associated with the second detected peak power value from the modified power delay profile to generate another modified power delay profile, and determines the delays associated with the first and second multipath signals by locating a peak power based on the first and second multipath signals in the another modified power delay profile.

14. The receiver of claim 13, further comprising:
   a channel estimator which estimates a response of a channel upon which the multipath signals are received using the determined delays, the channel estimation producing a phase difference between the first and second multipath signals,
   wherein the path searcher detects a third peak power value in the power delay profile, subtracts power values associated with the third detected peak power value from the power delay profile to generate a third modified power delay profile, detects a fourth peak power value in the third modified power delay profile, subtracts power values associated with the fourth detected peak power value to produce a fourth modified power delay profile, and determines the delays associated with the first and second multipath signals by locating a peak power based on the first and second multipath signals in the fourth modified power delay profile, wherein the subtraction of power values associated with the third and fourth detected peak power values accounts for the phase difference.

15. The receiver of claim 13, wherein the power values associated with the first and second detected peak power values are power values of sidelobes corresponding to the first and second detected peak power values.

16. The receiver of claim 13, wherein the power values associated with the first and second detected peak power values are power values of sidelobes and part of a mainlobe corresponding to the first and second detected peak power values.

17. The receiver of claim 13, wherein the first and second detected peak power values are respectively the highest and second highest detected peak power values of the power delay profile.

18. A receiver that compensates for multipath delays, comprising:
   a path searcher which receives a power delay profile comprising at least a first and second multipath signal, determines a first set of delays associated with the first and second multipath signals, the first set of delays being determined without accounting for a phase difference between the first and second multipath signals, performs a channel estimation using the determined first set of delays, the channel estimation producing a phase difference between the first and second multipath signals, and determines a second set of delays associated with the first and second multipath signals, the second set of delays being determined based on the phase difference produced by the channel estimation.

19. The receiver of claim 18, wherein the first and second set of delays are determined by subtracting sidelobe powers associated with the first multipath signal prior to determining the delay associated with the second multipath signal.

20. A receiver that compensates for multipath delays, comprising:
   a path searcher which receives a power delay profile comprising at least a first and second multipath signal, subtracts a power value associated with a peak of the first multipath signal from the received power delay profile to generate a first modified power delay profile, subtracts a power value associated with a peak of the second multipath signal from the first modified power delay profile to generate a second modified power delay profile, calculates a difference between the power value associated with a peak of the first multipath signal in the second modified power delay profile and the power value associated with the peak of the first multipath signal in the first modified power delay profile, adjusts a power value associated with a peak of the first multipath signal in the second modified power delay profile as a function of the difference to generate another modified power delay profile; and
   a channel estimator which performs channel estimation using the another modified power delay profile.

21. The receiver of claim 20, wherein the path searcher calculates a difference between the power value associated with a peak of the second multipath signal in the power delay profile and the power value associated with the peak of the second multipath signal in the second modified power delay profile, wherein a power value associated with a peak of the second multipath signal in the second modified power delay profile is adjusted as a function of the difference in the generation of the another modified power delay profile, and wherein a delay associated with the second is determined multipath signal is determined using the another modified power delay profile.

22. A method for determining delays of multipath signals comprising:
  a) receiving by a receiver a power delay profile comprising a plurality of multipath signals;
  b) detecting a peak power value in the power delay profile;
  c) subtracting power values associated with the detected peak power value from a most recent power delay profile to generate a new power delay profile;
  d) repeating steps b)-c) until a desired number of peaks have been detected, where the generated new power delay profile from one iteration is the most recent power delay profile of the next iteration; and
  e) determining a first set of delays associated with the plurality of multipath signals by locating peak powers associated with the plurality of multipath signals of the most recent power delay profile.

23. The method of claim 22, wherein the peak powers are detected in order of descending powers.

24. The method of claim 22, further comprising:
  f) performing a channel estimation using the determined first set of delays, the channel estimation producing phase differences between the plurality of multipath signals;
  g) repeating steps b)-d), wherein the subtracting step employs the phase differences produced by the channel estimation; and
  h) determining a second set of delays associated with the plurality of multipath signals by locating the peak powers associated with the plurality of multipath signals in the most recent power delay profile.

25. The method of claim 24, wherein steps b)-e) are repeated iteratively.

26. The method of claim 24, wherein steps g)-h) are repeated iteratively.

* * * * *